Figure 1:
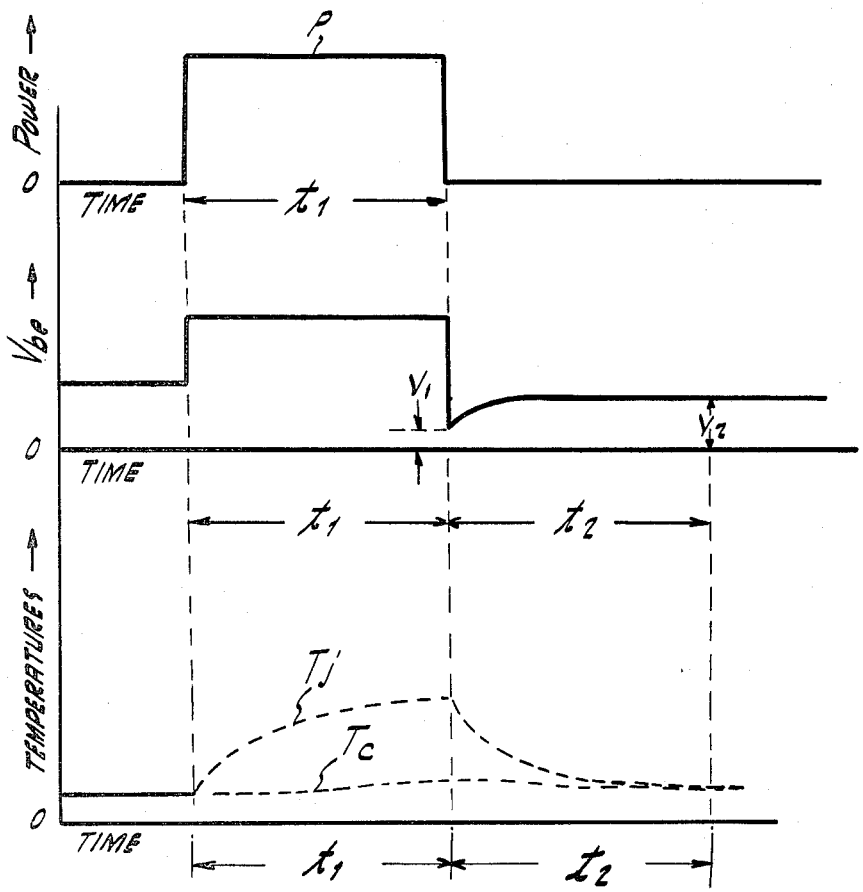

United States Patent Office 3,253,221
Patented May 24, 1966

3,253,221
METHOD OF MEASURING THE THERMAL RESISTANCE OF A SEMICONDUCTOR DEVICE BY PROVIDING A STABILIZED TEMPERATURE DIFFERENCE BETWEEN THE CASE AND A PN JUNCTION THEREIN AND THEREAFTER OBTAINING MEASUREMENTS OF A TEMPERATURE SENSITIVE PARAMETER
Peter A. Peckover, Somerville, N.J., assignor to Radio Corporation of America, a corporation of Delaware
Filed Feb. 7, 1962, Ser. No. 171,742
4 Claims. (Cl. 324—158)

This invention relates generally to the art of testing semiconductor devices, and more particularly to improved apparatus for and a novel method of measuring the thermal resistance of semiconductor devices. The improved apparatus and novel method of the present invention are particularly useful for measuring the thermal resistance of transistors rapidly and automatically in the factory.

The thermal resistance of a device has been defined as the effective temperature rise per unit power dissipation of a designated junction above the temperature of a stated external reference point under conditions of steady state operation. In semiconductor devices, a PN junction such, for example, as the junction between the emitter and the base of a transistor, may be designated as the junction, and the external reference point may be the case in which the semiconductor material containing the junction is enclosed.

A knowledge of the value of the thermal resistance of a semiconductor device is of importance to the design engineer because it enables him to determine the safe maximum power dissipation of the semiconductor device in a particular application. In the factory, the thermal resistance value of a semiconductor device may indicate the quality of the soldered joint between the semiconductor material and the case. It is believed that at present the measurement of the thermal resistance of a cased semiconductor device is the only effective means of detecting differences in the quality of this soldered joint, a factor in determining the safe maximum power dissipation of the semiconductor device.

The thermal resistance of a semiconductor device is usually not measured routinely on all semiconductor units in the factory because prior art methods of making such measurements are relatively inconvenient and slow, often taking as much as five minutes per unit. In the prior art methods, the semiconductor device under test has to be attached to a heat sink. The operator has to wait for two steady state conditions betwen the junction of the device and the heat sink. The operator also has to adjust power and to make calculations before he can determine the thermal resistance of the semiconductor device. The prior art methods also require a thermometric measurement of the case temperature, a difficult measurement to obtain.

It is an object of the present invention to provide improved apparatus for and a novel method of measuring the thermal resistance of a semiconductor device more rapidly and conveniently than provided by prior art apparatus and methods.

Another object of the present invention is to provide improved apparatus for and a novel method of measuring the thermal resistance of a semi-conductor device without the use of heat sinks, thermometers, and the need to make calculations.

A further object of the present invention is to provide improved apparatus for and a novel method of measuring the thermal resistance of a semiconductor device that lend themselves to a high degree of repeatability.

Still a further object of the present invention is to provide improved apparatus for measuring the thermal resistance of a semiconductor device that is reliable in operation, lends itself to the routine, automatic testing of semiconductor devices in the factory, and is highly efficient in use.

The improved apparatus and novel method of the present invention will be described in connection with the measurement of the thermal resistance of a transistor. In accordance with the present invention, generally speaking, a relatively large constant power pulse P is applied to the transistor for a period of time $t1$ until the temperature difference between the case and the emitter-base junction of the transistor is substantially constant. After the relatively large power pulse P is removed, a relatively smal constant current is applied to the transistor as a bias, and a temperature-sensitive parameter of the transistor, such as the voltage $Vbe$ between the base and the emitter of the transistor, is sampled at two points on the $Vbe$ recovery curve. The first sample V1, representative of the junction temperature $Tj$ of the transistor at the end of the power pulse, is taken immediately after the time $t1$. The second sample V2, representative of the case temperature $Tc$ of the transistor, is taken after a period of time $t2$. It has been determined that, for a suitable low forward bias current, the voltage between the base and the emitter of the transistor is a temperature-sensitive parameter of a transistor that varies with temperature at a substantially constant rate M, in millivolts/°C. for a family of similar semiconductor devices.

The thermal resistance $R_{th}$ (junction to case) may be represented:

$$R_{th} = \frac{T_j - T_c}{\text{power dissipated at junction (under steady state conditions)}} \quad (1)$$

or $$R_{th} \simeq \frac{V1 - V2}{MP} \quad (2)$$

Since the values of M and P may be made constant, the difference between V1 and V2 can be determined by a differential amplifier, and the output of the differential amplifier may be applied to a suitably calibrated indicator to indicate thermal resistance directly on a linear scale.

Figure 2:
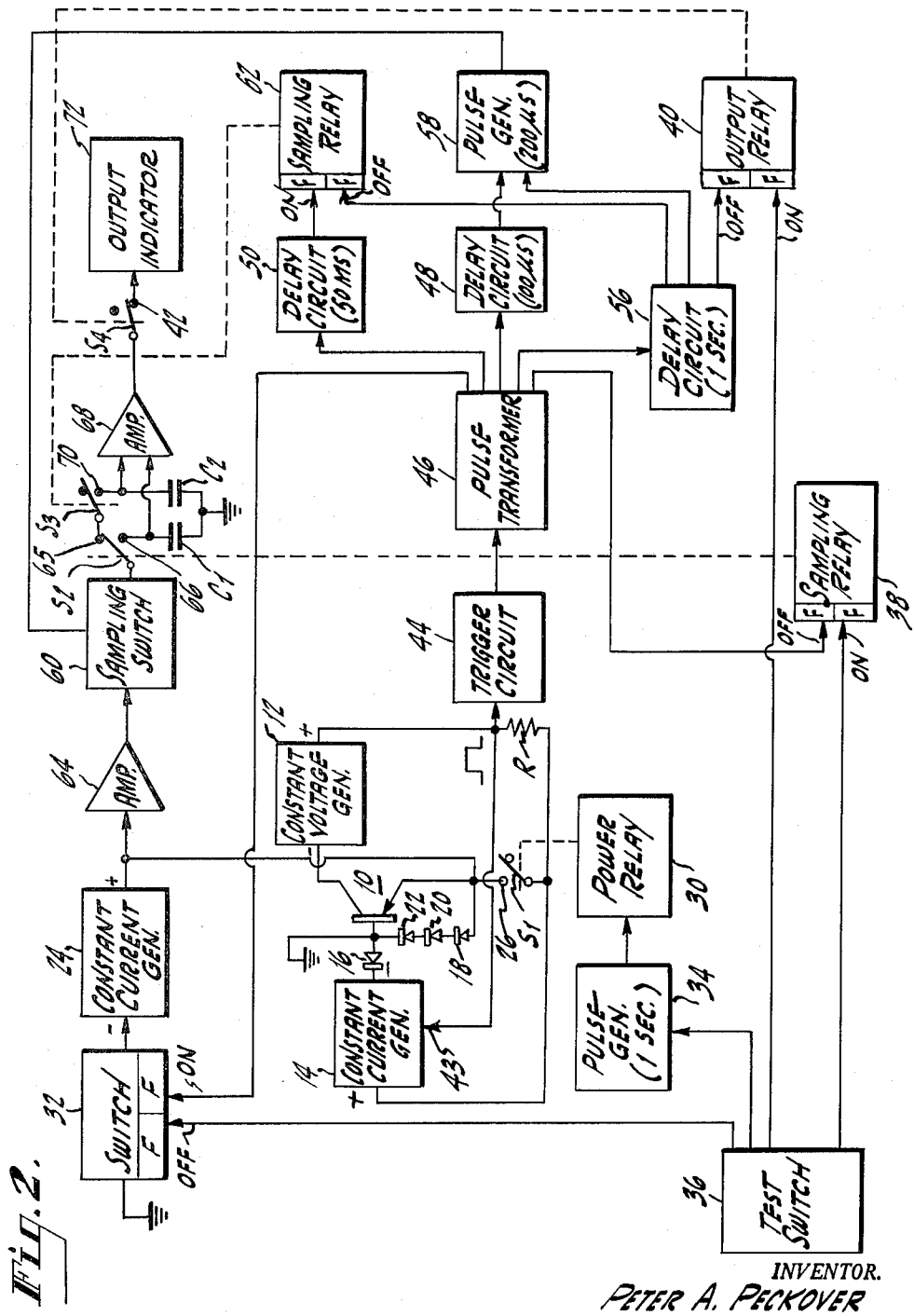

The novel features of the present invention, both as to its organization and method of operation, as well as additional objects and advantages thereof, will be more readily understood from the following description, when read in connection with the accompanying drawing, in which:

FIG. 1 is a series of graphs used to explain the principle of operation of the apparatus, and the method of the present invention; and FIG. 2 is a schematic diagram mostly in block form, of apparatus for measuring the thermal resistance of a semi-conductor device in accordance with the present invention.

Referring, first, particularly to FIG. 2, there is shown a semiconductor device, such as a transistor 10, connected in a circuit for determining the thermal resistance $R_{th}$ of the transistor 10. The collector of the transistor 10 is connected to the negative terminal of a source 12 of constant voltage, such as a regulated power supply. The positive terminal of the voltage source 12 is connected to the positive terminal of a constant current source 14, also a regulated power supply, through a resistor R. The negative terminal of the current source 14 is connected to the base of the transistor 10 through a fast recovery diode 16, the negative terminal of the current source 14 being connected to the cathode of the diode 16. The emitter of the transistor 10 is connected to the base through serially connected diodes 18, 20 and 22 to limit the base-emitter potential to a substantially fixed value.

Means are provided to supply a suitably low forward bias current to the transistor 10. To this end, the positive terminal of a constant current source 24, a regulated power supply, is connected to the emitter of the transistor 10 and to a fixed contact 26 of a single pole-double throw switch S1. The other fixed contact of the switch S1 is floating. The switch S1, shown in its open position, can be actuated by a power relay 30. The base of the transistor 10 is connected to a common connection, such as ground. The negative terminal of the constant current source 24 is connected to the common connection, or ground, through a switch 32, which is transistor actuated through a bistable flip-flop circuit and normally biased to an "on" condition, thus normally grounding this negative terminal.

Means are provided to apply a relatively large constant power pulse P to the transistor 10 for a period of time $t1$ until the difference between the temperature of the case of the transistor 10 and that of the emitter-base junction becomes substantially constant. To this end, a pulse generator 34, which may consist of a monostable flip-flop circuit having a pulse of output of one second, has its output connected to the power relay 30. The input of the pulse generator 34 is connected to a test switch 36. The test switch 36 comprises a microswitch in a pulse generator, and it is adapted to provide a pulse when it is actuated momentarily. The test switch 36 is connected to the transistor switch 32 to bias it "off" when the test switch 36 is actuated, for example, manually. The test switch 36 is also connected to a sampling relay circuit 38 which may comprise a relay and a bistable flip-flop circuit having an output connected to actuate the relay. When actuated, the sampling relay 38 closes a normally open single pole-double throw switch S2. The test switch 36 is also connected to a bistable flip-flop circuit and an output relay 40 which may be actuated by this flip-flop circuit. The output relay 40 actuates a single pole-double throw switch S4 whose arm is normally in contact with a fixed contact 42.

The constant voltage source 12 is connected to a feedback terminal 43 of the constant current source 14 and to a differentiator and trigger circuit 44. The differentiator and trigger circuit 44 comprises means for differentiating any pulses that may appear across the resistor R, and a monostable flip-flop trigger circuit triggered by each such differentiated pulse. The output of the trigger circuit is applied to a pulse transformer 46, and the output of the pulse transformer 46 is applied to a 100 microsecond delay circuit 48 which may comprise a monostable flip-flop circuit. The output of the pulse transformer 46 is also connected to the switch 32 to turn the latter "on." The output of the pulse transformer 46 is also connected to a 50 millisecond delay circuit 50 and to a one second delay circuit 56 each of which may comprise a different monostable flip-flop circuit. The output of the delay circuit 56 is connected to the output relay 40 to turn the latter "off." The output of the delay circuit 48 is connected to the input of a 200 microsecond pulse generator 58. The output of the delay circuit 56 is also connected to the input of the pulse generator 58, and the output of the pulse generator 58 is connected to a sampling switch 60 to turn the latter "on." The output of the sampling switch 60 is connected to the arm of the switch S2. The output of the delay circuit 50 is connected to a sampling relay 62 to turn the latter "on." The sampling relay 62 is turned "off" by an output pulse from the delay circuit 56. When actuated, the sampling relay 62 actuates a single pole-double throw switch S3.

Means are provided to sample the voltage between the emitter and the base of the transistor 10. To this end, the emitter of the transistor 10 is connected to the input of a unity gain amplifier 64. The output of the amplifier 64 is applied to the arm or movable contact of the switch S2 through the sampling switch 60, which may comprise a low leakage switching transistor. The movable contact of the switch S2 is normally in contact with a fixed contact 65, and the contact 65 is connected to the movable contact of the switch S3.

Voltage samples may be stored on capacitors C1 and C2. One plate of each of the capacitors C1 and C2 is connected to the common connection, or ground. The other plate of the capacitor C1 is connected to a fixed contact 66 of the switch S2 and to one of the inputs of a differential amplifier 68. The other plate of the capacitor C2 is connected to a fixed contact 70 of the switch S3 and to the other of the inputs of the differential amplifier 68. The output of the amplifier 68 is connected to an output indicator 72 through the normally closed switch S4. The movable contact of the switch S4 is normally in contact with the fixed contact 42 and the contact 42 is connected to the output indicator 72 which may comprise a moving coil meter, a digital voltmeter, or a go-no-go-indicator of any suitable type.

The operation of the circuit shown in FIG. 2 for measuring the thermal resistance of the transistor 10 will now be explained with the aid of the graphs shown in FIG. 1. The switches S1, S2, S3, and S4 are shown in their normal pre-test state. Before the test switch 36 is actuated, the constant current generator 24 delivers a small forward current $Im$ to the base-emitter circuit of the transistor 10. The voltage (maximum 10 volts) of the constant current source 14 is less than the voltage (12 volts) of the constant voltage source 12. Thus, the fast recovery diode 16 is reverse biased, and no current flows through the collector-base circuit of the transistor 10 when the switch S1 is in its normal position. Also, no current flows through the emitter-collector circuit of the transistor 10 when the switch S1 is open.

When the test switch 36 is closed, the one shot pulse generator 34 energizes the power relay 30 for one second ($t1$). With the closing of the test switch 36, the sampling relay 38 and the output relay 40 are also energized, and switches S2 and S4 are actuated respectively to close to contact 66 and to open from contact 42. During the period when the switch S1 is closed to contact 26, the constant current generator 14 provides a constant collector current Ic controlled by the feedback from the resistor R, across which there is maintained a constant voltage of 2 volts. Since there is a constant voltage output of 12 volts from the constant voltage generator 12, and a constant voltage of 2 volts of opposite polarity across the resistor R, a constant voltage of 10 volts is maintained between the collector and the emitter of the transistor 10 under test. Thus, during the time $t1$, a constant power pulse P equal to 10 times Ic is dissipated in the transistor 10. After one second ($t1$), the power relay 30 is de-energized, the switch S1 returns to its normal pre-test state, and the constant voltage source 12 and the constant current source 14 are isolated from each other and from the transistor 10 under test by the fast recovery diode 16. The trailing edge of the 2 volt pulse across the resistor R is differentiated and shaped by the trigger circuit 44.

The pulse transformer 46 functions as an isolation transformer to isolate the trigger circuit 44 from the rest of the measuring circuit. The output pulse from the pulse transformer 46 turns the switch 32 "on," whereby the constant current generator 24 establishes a small forward current to the base-emitter circuit of the transistor 10. The output pulse from the pulse transformer 46 is also delayed 100 microseconds by the delay circuit 48 and applied to the one-shot, 200 microsecond pulse generator 58. The output pulse from the generator 58 closes the sampling switch 60 for 200 microseconds. At this point, the emitter of the transistor 10 is connected through the amplifier 64 and the sampling switch 60 and the switch S2 to the capacitor C1. The time constant of the charging circuit for the capacitor C1 under these conditions is arranged to be very much less than 200 microseconds so that the capacitor C1 may charge quickly to a voltage V1, shown in FIG. 1. The output of the pulse transformer 46 also de-energizes the switch S2 (which now makes contact 65) under control of the sampling relay 38 and, after a 50 millisecond delay due to delay circuit 50, energizes the sampling switch S3 under control of the sampling relay 62 to make contact 70.

The output pulse from the pulse transformer 46 is delayed for a period of time $t2$, in this case one second, by the delay circuit 56. The output from the delay circuit 56 is applied to the pulse generator 58 which provides another 200 microsecond pulse to the sampling switch 60. Now, the emitter of transistor 10 is connected through the amplifier 64, the sampling switch 60, the switch S2, and the switch S3 to the capacitor C2. The capacitor C2 also is arranged to charge quickly to the voltage of the emitter shown in FIG. 1. The output of delay circuit 56, at the end of the period $t2$ de-energizes the sampling relay 62 and returns to normal state the output relay 40 which, in turn, returns the switches S3 and S4, respectively, to break contact 70 and make contact 42. The voltages presented to the differential amplifier 68 are are V1 and V2, the voltages to which capacitors C1 and C2 are respectively charged at this time. The difference in these voltages is proportional to the thermal resistance of the transistor under test, as explained above. The output relay 40 when de-energized connects the output of the amplifier 68 to the output indicator 72. The output of the amplifier 68 has been isolated from the output indicator 72 by the switch S4, however, until the potential difference between the potentials across the respective capacitors C1 and C2 was established.

The output indicator 72 may be a normal moving coil meter with a linear °C./Watt scale, a digital voltmeter, with or without a recording system, or a go-no-go detector. If the output indicator 72 is a moving coil meter, it may be calibrated by presenting to the amplifier 68 a D.-C. signal equal to the number of millivolts change in V$be$ corresponding to a change of junction temperature of 20° C., for example, for a given family of transistors. The amplifier 68 is adjusted for a full scale deflection with this signal. The full scale value in °C./Watt is also $20/P$, where P is the constant power dissipated in the transistor 10 under test. The remainder of the scale of the meter is linear. The full scale sensitivity of the °C./Watt meter may be changed by changing the resistor R to one of another fixed value.

Referring, now, to FIG. 1, the power pulse P applied to the transistor 10 is shown by the square-wave pulse P for the period of time $t1$. The voltages V1 and V2 on the V$be$ recovery curve of the transistor 10 are measured at the beginning and at the end of period $t2$. From an inspection of the curve T$j$ in FIG. 1, it is apparent that the period of the power pulse $t1$ should be long enough to permit the temperature difference between the case and the junction to become substantially constant. The period of time $t2$ is normally equal to the time $t1$ and is long enough to permit the temperature of the junction T$j$ to become substantially the same as the temperature of the case T$c$. The periods $t1$ and $t2$ are contiguous in time, i.e. one begins when the other ends.

A relationship between thermal resistance R$_{th}$ and the voltages V1 and V2 is derived as follows:

V1 is the value of the base-emitter voltage in millivolts and is a measure of the junction temperature T$j$ at the end of the power pulse P. V2 is the value of the base-emitter voltage in millivolts, measured after a delay of time $t2$, and is a measure of the case temperature T$c$ at this point. The case temperature T$c$ does not materially change during this time. Thus, V2 is a measure of the case temperature T$c$ at the end of the power pulse P. If M is the rate of change of the base-emitter voltage with temperature in millivolts per degree centigrade (a constant for a particular family of semiconductor devices), then $$M = \frac{V1 - V2}{Tj - Tc} \quad (3)$$

and $$Tj - Tc = \frac{V1 - V2}{M} \quad (4)$$

Since the power pulse P has been applied for a period $t1$, during which the temperature difference between the case and the junction became substantially constant, the conditions approximate the steady state requirements in the aforementioned definition of thermal resistance.

Since the designated junction chosen in the transistor 10 is between the emitter and base, and the external reference is the nearest part of the case attached to the transistor 10 containing the emitter-base junction, then $$R_{th} = \frac{Tj - Tc}{P} \quad (5)$$

where P equals constant power dissipated in watts. Substituting for T$j$-T$c$ in (4) above, $$R_{th} = \frac{V1 - V2}{MP} \quad (6)$$

Rearranging, we get $$V1 - V2 = (MP) \times R_{th} \quad (7)$$

or $$V1 - V2 = (\text{Constant}) \times R_{th} \quad (8)$$

Thus, it is seen that the difference between the sampling voltages V1 and V2 is proportional to the thermal resistance R$_{th}$. Hence, the equipment can be precalibrated to read thermal resistance directly, as described above.

From the foregoing description, it will be apparent that there has been disclosed improved apparatus for, and a novel method of, obtaining the thermal resistance of a semiconductor device. Various components useful therein, as well as variations in the apparatus and method coming within the spirit of this invention, will, no doubt, readily suggest themselves to those skilled in the art. For example, the voltages V1 and V2 may be temperature-sensitive parameters of a semiconductor device other than the voltages across the emitter-base junction. The voltages across the collector-base junction may be utilized as well. Also, while the improved apparatus and novel method of the present invention have been described in connection with obtaining the thermal resistance of a PNP semiconductor device, it will be understood that NPN types of semiconductors may also be tested by reversing the power supplies in a manner well known in the art. Hence, it is desired that the foregoing shall be considered merely illustrative and not in a limiting sense.

What is claimed is:
1. A method of measuring the thermal resistance of a semiconductor device, said semiconductor device being enclosed within a case and having a junction, said method comprising the steps of
   (a) applying a relatively large pulse of constant power to said device for a first period of time until the difference in temperature between that of said case and that of said junction is substantially constant,
   (b) removing said pulse of constant power from said device,
   (c) applying to said device a relatively small current of a magnitude at which a temperature-sensitive parameter of said device varies with temperature at a constant rate,
   (d) obtaining a first sample of said temperature-sensitive parameter immediately after said power is removed,
   (e) obtaining a second sample of said temperature-sensitive parameter after a second period when the temperature of said junction has reached substantially the temperature of said case, and (f) measuring the difference between said first and said second samples as a function of said thermal resistance.

2. A method of measuring the thermal resistance of a semiconductor device, said semiconductor device being enclosed within a case and having a PN junction, said method comprising the steps of (a) applying a pulse of constant power to said device for a first period until the difference in temperature between that of said case and that of said junction is substantially constant, (b) removing said pulse of constant power from said device, (c) biasing said junction of said device with a current of a magnitude at which a temperature-sensitive parameter of said device varies at a substantially constant rate with temperature, (d) storing a first sample of said temperature-sensitive parameter immediately after said pulse of constant power is removed, (e) storing a second sample of said temperature-sensitive parameter after a second period when the temperature of said junction has reached substantially the temperature of said case, and (f) obtaining the difference between said first and said second samples as a function of said thermal resistance.

3. A method of measuring the thermal resistance of a transistor, said transistor being enclosed within a case and having an emitter electrode, a base electrode, and a collector electrode, said method comprising the steps of (a) applying a pulse of constant power to said transistor for a first period of time until the difference in temperature between that of said case and that of the junction between two of said electrodes is substantially constant, (b) removing said pulse of constant power from said transistor, (c) applying to said junction a forward bias current of a magnitude at which the voltage between two of said electrodes varies at a substantially constant rate with temperature, (d) obtaining a first sample of said voltage after said pulse of constant power is removed, (e) obtaining a second sample of said voltage after a second period of time when the temperature of said junction has reached substantially the temperature of said case, and (f) obtaining the difference between said first and said second samples as a function of said thermal resistance.

4. A method of measuring the thermal resistance of a transistor, said transistor being enclosed within a case and having an emitter electrode, a base electrode, and a collector electrode, said method comprising the steps of (a) applying a pulse of constant power to said transistor for a first period of time until the difference in temperature between that of said case and that of the junction between said base and emitter electrodes is substantially constant, (b) removing said pulse of constant power from said transistor, (c) applying to said junction a forward bias current of a magnitude at which the voltage between said emitter and said base electrodes varies at a substantially constant rate with temperature, (d) obtaining a first sample of said voltage after said pulse of constant power is removed, (e) obtaining a second sample of said voltage after a second period of time when the temperature of said junction has reached substantially the temperature of said case, and (f) measuring the difference between said first and said second samples as a function of said thermal resistance.

References Cited by the Examiner

UNITED STATES PATENTS 2,884,536    4/1959    Swift _____ 250—83.4
3,034,051    5/1962    Higgins _____ 324—73

OTHER REFERENCES

IBM Tech Disclosure Bulletin, Zakarias, volume 2, No. 6, April 1960, pages 77–79.

Ryerson and Aronson: "Electronics," September 1945, pages 110 and 111.

WALTER L. CARLSON, *Primary Examiner.*

EDWARD L. STOLARUN, *Assistant Examiner.*